United States Patent [19]
Gum et al.

[11] Patent Number: 5,381,535
[45] Date of Patent: Jan. 10, 1995

[54] DATA PROCESSING CONTROL OF SECOND-LEVEL QUEST VIRTUAL MACHINES WITHOUT HOST INTERVENTION

[75] Inventors: Peter H. Gum, Poughkeepsie; Roger E. Hough, Highland; Robert E. Murray, Woodstock, all of N.Y.

[73] Assignee: International Business Machines Corporation, Armonk, N.Y.

[21] Appl. No.: 150,332

[22] Filed: Nov. 9, 1993

Related U.S. Application Data

[63] Continuation of Ser. No. 603,000, Oct. 24, 1990, abandoned.

[51] Int. Cl.[6] .............................................. G06F 12/00
[52] U.S. Cl. ..................................... 395/375; 395/425; 395/650; 364/246; 364/966.4
[58] Field of Search ................ 395/650, 700, 800, 375, 395/775

[56] References Cited

U.S. PATENT DOCUMENTS

| | | | |
|---|---|---|---|
| 3,789,365 | 1/1974 | Jen et al. | 364/DIG. 1 |
| 4,347,565 | 8/1982 | Kaneda et al. | 364/200 |
| 4,456,954 | 6/1984 | Bullions et al. | 364/200 |
| 4,533,996 | 8/1985 | Hartung et al. | 364/200 |
| 4,660,144 | 4/1987 | Walsh | 364/200 |
| 4,816,991 | 3/1989 | Watanabe | 364/200 |
| 4,843,541 | 6/1989 | Bean et al. | 364/200 |

*Primary Examiner*—David Y. Eng
*Attorney, Agent, or Firm*—Bernard M. Goldman

[57] ABSTRACT

A data processing system operated with multiple levels of virtual machine guests under a host control program. The second level of guests are invoked, operated, and terminated without host intervention, as has been required in prior systems, to significantly increase the operating efficiency of the system. Address translation is done by providing machine capability to translate second level guest addresses to real memory addresses taking advantage of the first level guest being located at a simple offset within real memory. Special facilities for second level guests periodically test for timing interruptions for second level guests and update the second level guest timing facilities.

5 Claims, 6 Drawing Sheets

RESERVED WORKING STORAGE

| | 0 | | | | | 63 |
|---|---|---|---|---|---|---|
| RWS1-09 | HOST PSW(0-15) | G1 LCTL CTLS | G1 PSW01 | G1 CR0(17-24) | | |
| RWS1-12 | GUEST 1 PREFIX | | | | | |

| | | |
|---|---|---|
| RWS2-00 | GUEST 1 GR 14 | |
| RWS2-01 | GUEST 1 GR 15 | |
| RWS2-06 | G1 STATE DESCRIPTION ADDRESS | |
| RWS2-12 | GUEST 2 PREFIX | |

| | | | | | |
|---|---|---|---|---|---|
| RWS3-08 | HOST GR 14 | | HOST GR 15 | | |
| RWS3-09 | G1 PSW(0-15) | G2 LCTL CTLS | G2 PSW01 | G2 CR0(17-24) | |
| RWS3-10 | HOST PSW | | | | |
| RWS3-12 | GUEST 1 PSW | | | | |

LEGEND: GUEST 1(G1)=FIRST LEVEL GUEST, GUEST 2(G2)=SECOND LEVEL GUEST
PSW=PROGRAM STATUS WORD, CR=CONTROL REGISTER, GR=GENERAL REGISTER

FIG. 4A

RESERVED WORKING STORAGE

| | 0 | | | | 63 |
|---|---|---|---|---|---|
| RWS1-09 | HOST PSW(0-15) | G1 LCTL CTLS | G1 PSW01 | G1 CR0(17-24) | |
| RWS1-12 | GUEST 1 PREFIX | | | | |

| RWS2-00 | GUEST 1 GR 14 |
|---|---|
| RWS2-01 | GUEST 1 GR 15 |
| RWS2-06 | G1 STATE DESCRIPTION ADDRESS |
| RWS2-12 | GUEST 2 PREFIX |

| RWS3-08 | HOST GR 14 | | | HOST GR 15 | |
|---|---|---|---|---|---|
| RWS3-09 | G1 PSW(0-15) | G2 LCTL CTLS | G2 PSW01 | G2 CR0(17-24) | |
| RWS3-10 | HOST PSW | | | | |
| RWS3-12 | GUEST 1 PSW | | | | |

LEGEND: GUEST 1(G1)=FIRST LEVEL GUEST, GUEST 2(G2)=SECOND LEVEL GUEST
PSW=PROGRAM STATUS WORD, CR=CONTROL REGISTER, GR=GENERAL REGISTER

CP PRIVATE AREA IN SYSTEM AREA    FIG. 4B

| OFFSET IN HEX | 0 | | 63 |
|---|---|---|---|
| 20 | HOST PREFIX REG | | |
| 100 | HOST CR0 | | HOST CR1 |
| 108 | HOST CR2 | HOST | HOST CR3 |
| 110 | HOST CR4 | CONTROL | HOST CR5 |
| 118 | HOST CR6 | REGISTER | HOST CR7 |
| 120 | HOST CR8 | SAVE AREA | HOST CR9 |
| 128 | HOST CR10 | | HOST CR11 |
| 130 | HOST CR12 | | HOST CR13 |
| 138 | HOST CR14 | | HOST CR15 |
| 140 | GUEST 1 CR0 | | GUEST 1 CR1 |
| 148 | GUEST 1 CR2 | | GUEST 1 CR3 |
| 150 | GUEST 1 CR4 | | GUEST 1 CR5 |
| 158 | GUEST 1 CR6 | GUEST 1 | GUEST 1 CR7 |
| 160 | GUEST 1 CR8 | CONTROL | GUEST 1 CR9 |
| 168 | GUEST 1 CR10 | REGISTER | GUEST 1 CR11 |
| 170 | GUEST 1 CR12 | SAVE AREA | GUEST 1 CR13 |
| 178 | GUEST 1 CR14 | | GUEST 1 CR15 |

FIG. 4C

DYNAMIC ADDRESS TRANSLATION CONTROL ARRAY

| 0 | 63 |
|---|---|
| GUEST 1 CR1 | GUEST 2 CR1 |
| GUEST 1 CR7 | GUEST 2 CR7 |
| GUEST 1 CR13 | GUEST 2 CR13 |
| GUEST 1 AR STO 1 | GUEST 2 AR STO 1 |
| ⋮ | ⋮ |
| 430 GUEST 1 AR STO N | GUEST 2 AR STO N |
| GUEST 1 ZONE ORIGIN | |
| GUEST 1 ZONE EXTENT | |
| GUEST 1 PREFIX | GUEST 2 PREFIX |
| 432 GUEST 1 CR0 (8-12) | GUEST 2 CR0 (8-12) |
| | GUEST 2 MAIN STG ORIGIN |
| | GUEST 2 MAIN STG EXTENT |

FIG. 5

RESERVED WORKING STORAGE 1

| | | |
|---|---|---|
| RWS1-05 | HOST CLOCK COMPARATOR | |
| RWS1-06 | GUEST 1 CPU TIMER + TOD | |
| RWS1-07 | GUEST 1 CLOCK COMPARATOR-GUEST 1 EPOCH | |
| RWS1-09 | | GUEST 1 TMG FLAGS |
| RWS1-11 | GUEST 1 EPOCH DIFFERENCE | |

510, 514

LEGEND: GUEST 1 (G1) = FIRST LEVEL GUEST

FIG. 6

RESERVED WORKING STORAGE 3

| | | |
|---|---|---|
| RWS3-09 | | GUEST 2 TMG FLAGS |
| RWS3-11 | GUEST 1 EPOCH DIFFERENCE + GUEST 2 EPOCH DIFFERENCE | |
| RWS3-14 | GUEST 2 CLOCK COMPARATOR-(G1 EPOCH + G2 EPOCH) | |
| RWS3-15 | GUEST 2 CPU TIMER + TOD | |

614, 610, 612

LEGEND: GUEST 2 (G2) = SECOND LEVEL GUEST

DATA PROCESSING CONTROL OF SECOND-LEVEL QUEST VIRTUAL MACHINES WITHOUT HOST INTERVENTION

This is a continuation of copending application(s) Ser. No. 07/603,000 filed on Oct. 24, 1990, now abandoned.

BACKGROUND OF THE INVENTION

1. Field of the Invention

This invention relates to computer systems and, more particularly, to high performance computer systems which provide for instruction processing using multiple levels of virtual machines. More particularly, this invention relates to apparatus and methods for increasing the performance of second level guests.

2. Description of the Prior Art

Mainframe computer systems such as the IBM 3090 computer system comprise a plurality of processors and large random access and sequential access storage devices. These large systems are capable of processing a large number of tasks in a short period of time. It is frequently desirable to divide this host processing power into separate partitions or "virtual machines" that can be operated by different users. The division is accomplished by the use of host control program software such as the IBM Virtual Machine/Extended Architecture (VM/XA) system product. Each of the virtual machines defined above can accept a "guest" operating system that may be different from the host operating system. Thus, for example, if the host is running the VM/XA operating system, the guest could operate the IBM MVS/XA system program. The guest virtual machines may in turn be divided into additional virtual machines for the performance of certain tasks.

The host control program or operating system is typically referred to as the level 0 machine. A guest operating on the host is typically referred to as a level 1 machine. An operating system executing in a level 1 machine may be referred to as a level 1 guest, and may itself create another level, a level 2 machine in which a level 2 guest is executed. The operating systems operating at levels 1 or 2 issue instructions that, they believe, are causing a real access to a processor or memory. Instead, these instructions are being interpreted to access real memory and processors. The IBM System/370 architecture manages this through a process known as interpretive execution of the virtual machine instructions. The System/370 architecture is described in the IBM Publication GA22-7000. The IBM System/370-XA implementation of interpretive execution is described in IBM Publication SA22-7095.

Interpretive execution requires the translation of instructions and addresses from the guest machine to the underlying real machine and real storage. An example of the translations required is the translation of memory addresses from the guest machine to real storage. U.S. Pat. No. 4,456,954, issued on Jun. 26, 1984 and assigned to the assignee of the present invention, describes interpretive execution and address translation under interpretive execution and is incorporated herein by reference.

The host machine initiates a guest operating system through a Start Interpretive Execution (SIE) instruction. The SIE instruction invokes interpretive execution hardware in the host causing the host to enter interpretive execution mode for the purpose of executing a program in a first level guest. SIE provides for the mapping of addresses by the first level virtual machine.

Each virtual machine to be operated as a guest of the host machine is described in a state description maintained in real storage. When an SIE instruction is encountered, the state description is used to establish the virtual machine environment for execution. At the same time, the existing host environment must be saved so it can be restored upon exit from the virtual machine. Upon completion of the SIE instruction, the current status of the guest virtual machine must be stored in the state description and the previous host environment restored to the real machine.

Among the interpretive execution facilities are dynamic address translation and guest timing services. Dynamic address translation is the process which translates a guest virtual address into a host real address allowing access to the real storage in the machine. The IBM System/370 employs a virtual memory mechanism in which real memory is divided into pages of a constant size, e.g., 4K bytes, which are addressed by segment and page indices. Thus, the virtual address of a memory location will be represented as a segment table index value, a page table index value, and a displacement within the page. To locate the actual data, the segment table, page table, and memory page must each be accessed. If the virtual address is specified in a guest operating system, the address that guest believes to be a real address must be further translated by the lower level guests and the host machine. As a result, several steps of address translation must occur.

A second facility provided by interpretive execution is guest timing. The System/370 architecture provides a single physical clock for measuring time within the computer. The host operating system can measure differences in time by simply comparing the clock at different points in time. Guest operating systems, however, must account for the periods of time when a different guest has control of the real machine resources. This accounting involves the maintenance of timing intervals and timing comparators.

SUMMARY OF THE INVENTION

The present invention is directed to providing apparatus and methods for significantly increasing the performance of a second level guest operating system. The present invention is directed to providing apparatus and logic to minimize the overhead required for second level guest initiation and exit, or second level address translation, and second level guest timing measurement.

The system according to the present invention comprises one or more instruction processors and storage means for providing real storage. The system includes partitioning means for partitioning the real processor and memory into two or more virtual machines. Guest operating system means are provided for operating each of the virtual machines and include means for partitioning a first level guest into two or more second level guests. Interpretive execution means are included for providing access by the first or second level guests to the one or more real instruction processors and storage means without returning control to the system partitioning means.

The system may further include real storage partitioning means for establishing fixed regions of real storage for each of the first level guest virtual machines. Enhanced address translation means are then provided to translate second level virtual addresses to real addresses based upon those fixed regions.

Timing facilities for a second level guest machine are provided for timing events relative to the real processor clock system and to the first level and host timing facilities.

BRIEF DESCRIPTION OF THE DRAWING

FIG. 4A is an illustration of the contents of machine facility save areas in reserved working storage according to the present invention.

FIG. 4B is an illustration of the content of a host save area and guest save area according to the present invention.

FIG. 4C is an illustration of the contents of a dynamic address translation control array according to the present invention.

FIG. 5 is an illustration of the contents of a first level guest timer facility storage according to the present invention.

FIG. 6 is an illustration of the contents of a second level guest timer facility storage according to the present invention.

DESCRIPTION OF THE PREFERRED EMBODIMENT

Figure 1:
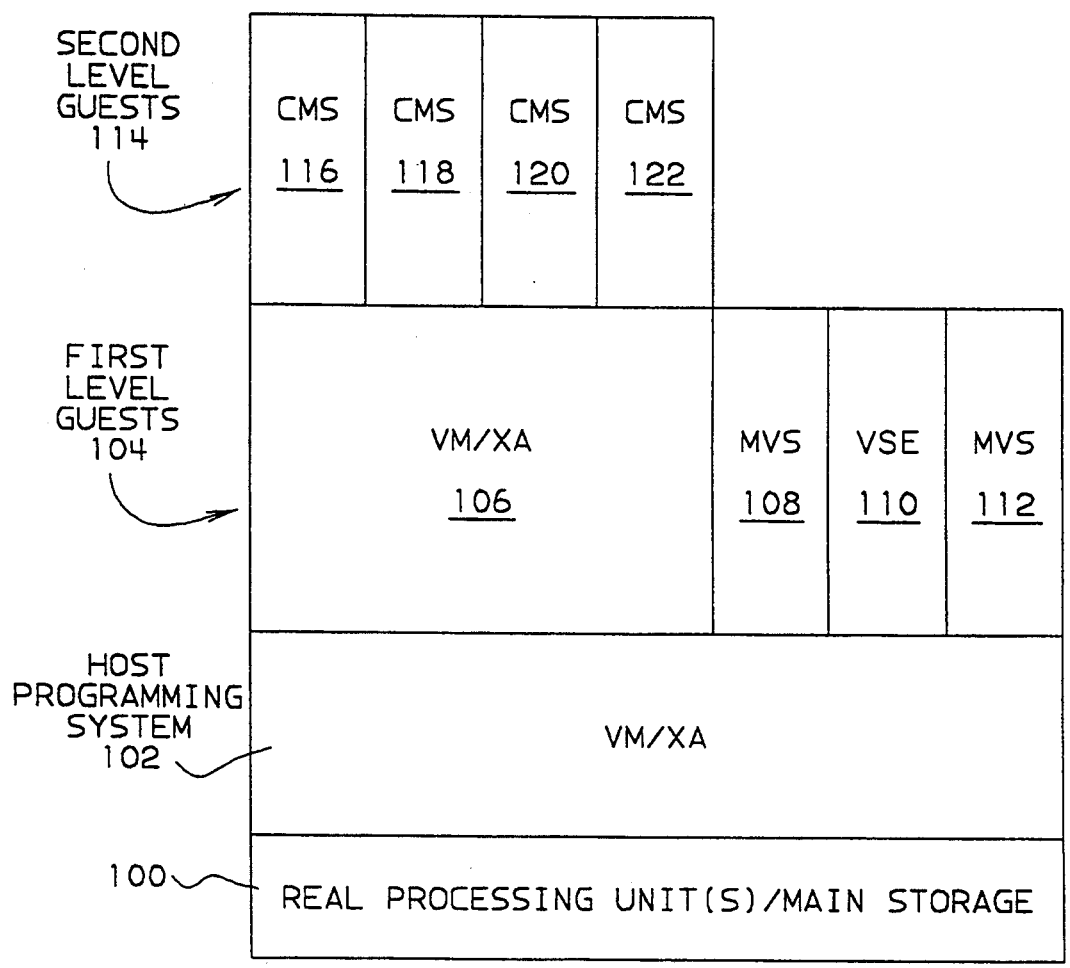
FIG. 1 is a diagram illustrating the relationship of the multiple levels of virtual machines to the real processor and storage.

FIG. 1 illustrates a logical structure of a computer system operating according to the present invention. The real instruction processing units (CPUs) and main storage are shown at 100. The one or more processing units are operated by a host operating system 102. The host operating system (VM/XA) of the present invention provides an ability to partition the real processor and storage resources into virtual machines. The host operating system of the preferred embodiment is the IBM VM/XA system product. (VM/XA is a trademark of the IBM Corporation). The host system allows the creation of level 1 virtual machines shown generally at 104, referred to as first level guests. Each of these guests 106, 108, 110 and 112, is controlled by an operating system which operates as though it was an independent machine. If the first level guest operating system is capable of subdividing its virtual machine into an additional level of virtual machines, level 2 virtual machines 114 may be created. Thus, for example, if the first level guest operating system is the IBM VM/XA system product 106, it may in turn create level 2 virtual machines (second level guests) operating, for example, the IBM Conversational Monitor System (CMS) as shown at 116, 118, 120 and 122.

The creation of first level and second level guests occurs through the execution of a Start Interpretive Execution (SIE) instruction. The SIE instruction establishes the environment necessary for the operation of the virtual machine. The initiation of a first level guest by the SIE instruction causes host values in certain machine facilities such as control registers, program status word, and general registers 14 and 15, to be saved in reserved working storage and at locations in the system area of the main storage, referred to as the Host Save Area. Guest values from the guest state description control block are then loaded into those machine facilities and guest execution begun. Each guest uses the system facilities on a time slice basis.

An attempt by the first level guest to initiate a guest of its own (a second level guest) would, in the prior art, result in control being passed back to the host programming system which would then run the second level guest as a first level guest but at degraded performance. The attempt by the first level guest to initiate a second level guest in the prior art resulted in an instruction interception. The intercepted instruction processing logic caused the first level guest to exit, the second level guest to be initiated as a first level guest, and then, upon completion of second level guest initiation, a return to the first level guest. This interception processing introduced a large amount of overhead for second level guest execution resulting in substantially degraded performance.

The computer system hardware in the prior art was not able to interpret second level guest because hardware mechanisms were provided only to handle a first level guest. In addition, a pageable second level guest whose dynamic address translation (DAT) function required both guest and host translation, was required to maintain both guest and host translation parameters in the hardware. The addition of the second level guest therefore required a three level address translation, further degrading performance.

The present invention is directed to eliminating these problems with second level guest execution and improving system performance. The present invention is directed to providing the apparatus and method to allow interpretive execution of second level guest instructions.

Figure 2:
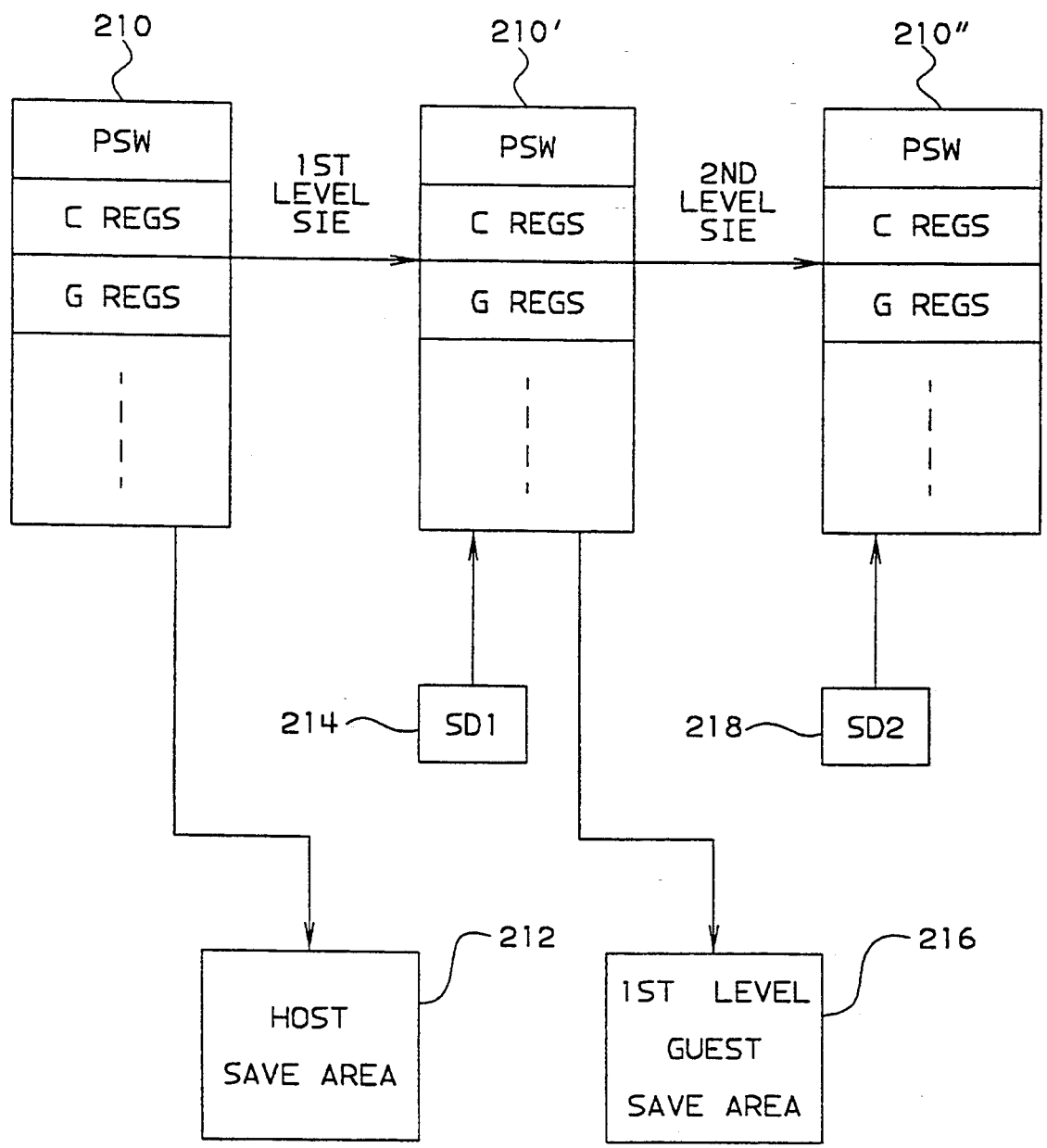
FIG. 2 is an illustration of the changing contents of real machine facilities when managed according to the present invention.

In the preferred embodiment of the present invention, initiation of a first level guest occurs in the same manner as in the prior art. FIG. 2 illustrates guest initiation according to the present invention. The machine facilities, including PSW, control registers and general registers, are shown generally at 210. Initiation of a first level guest through an SIE instruction causes machine facilities associated with the host to be stored in the Host Save Area 212. First level guest machine facility information is loaded from state description 214 (SD1) to become modified machine facilities 210'.

The present invention allocates a new fixed storage area designated as the first level Guest Save Area. First level Guest Save Area 216 is available for storage of first level guest machine facilities 210' upon execution of an SIE instruction creating a second level guest. After storage of first level guest facilities, second level guest facility information is loaded from state description 218 (SD2) into machine facilities becoming 210". The machine facility areas 210, 210' and 210" represent the real machine facilities as they change over time due to loading the mode field da%a for the appropriate level of guest execution.

An exit from the second level guest causes machine facility information 210" to be stored back into state description 218 and first level machine facility information 210' to be reloaded from first level Guest Save Area 216. An exit from the first level guest causes first level guest facility information to be stored back to state description 1 214 and Host Save Area information 212 to be reloaded into machine facilities 210.

Figure 3:
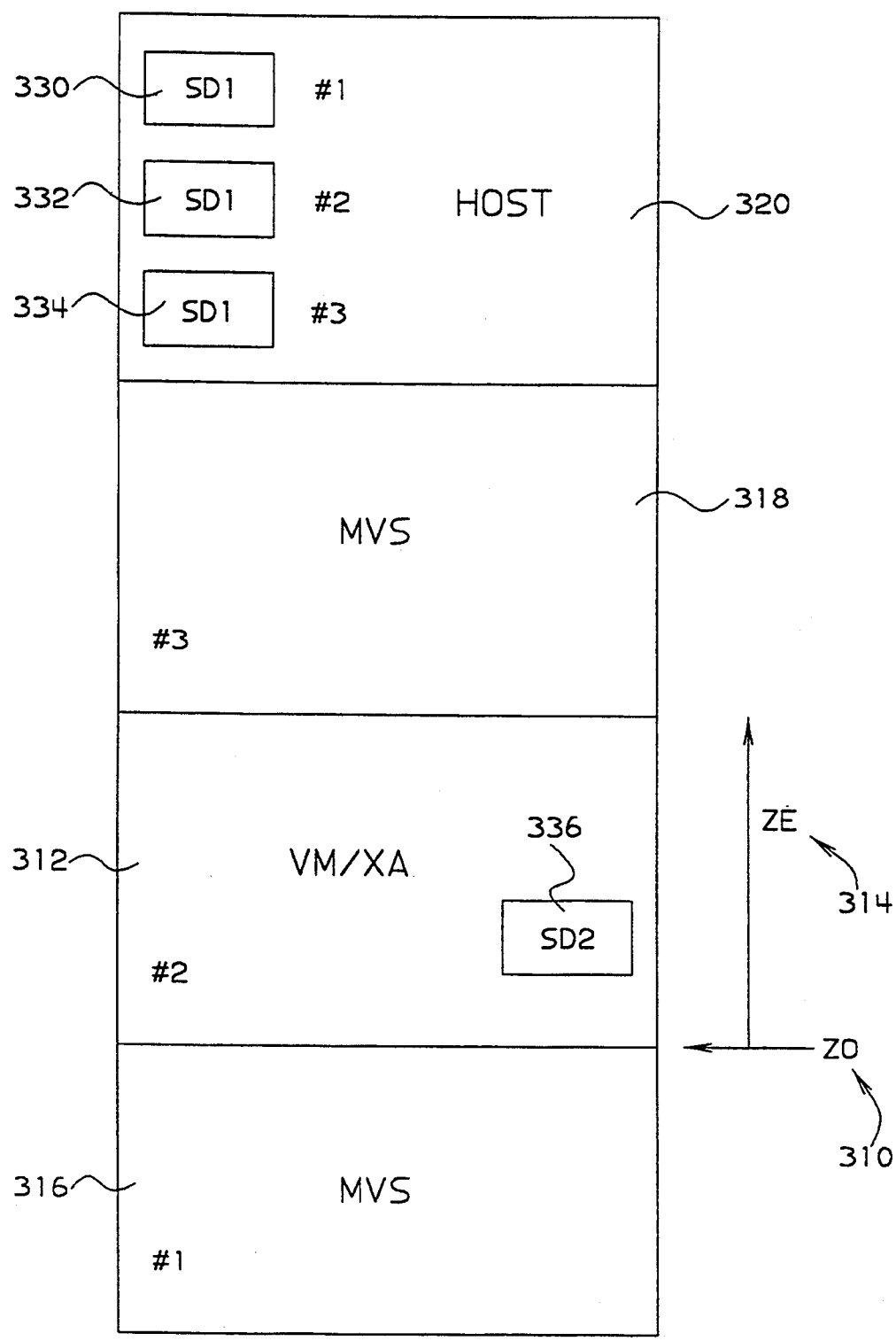
FIG. 3 is an illustration of real storage allocations for fixed guest regions.

The preferred embodiment of the present invention provides the apparatus and methods necessary to divide real storage into fixed regions for each first level guest virtual machine. This facility is known as the region relocate facility (RRF). The region relocate facility allows guest absolute addresses to be mapped directly into main storage addresses by means of a zone origin and zone extent. The zone origin (ZO) is a real memory address defining the beginning of storage allocated for a particular first level guest machine. As illustrated in FIG. 3, zone origin 310 indicates the starting point for storage allocated to first level guest #2 312. A second value labelled zone extent (ZE) 314 defines the extent of the memory region allocated to the first level guest. Similar regions 316 and 318 are defined for the other first level guests shown in FIG. 3. The example of three first level guests as shown in FIG. 3 is by way of illustration only; the apparatus and methods of the present invention are not limited to three first level virtual machines. The dynamic address translation control array shown in FIG. 4C maintains region information for each first level guest including Zone Origin 430 and Zone Extent 432. Memory area 320 is designated as the Host System Area and is used to maintain the various data and programs needed by the host processing system.

State descriptions for first level guest systems are stored in the host System Area 320. The state description for virtual machine #1 is shown at 330 and for the other two example machines at 332 and 334. The state descriptions for second level virtual machines are stored in the memory region allocated to the initiating first level virtual machine. Thus, for example, second level state description 336 is stored within virtual machine #2 region of memory 312.

The preferred embodiment is implemented through the provision of microcode added to the start interpretive execution instruction. This microcode causes the saving and loading of the machine facilities and includes the definition for first level guest save area 216. The microcode uses reserved working store arrays in the execution element of the central processor and system area locations to save various host and first level guest values as shown in FIGS. 4A and 4B.

The allocation of fixed regions of memory for each first level guest also simplifies the address translation for pageable second level guests. Instead of requiring three levels of translation as the prior art required, the final level of host translation is replaced by a simple adding of a zone origin that relocates the first level guest into its own zone or partition in storage. A dynamic address translation control array stores the zone definition information for the guests as shown in FIG. 4C. The overall translation process for a pageable second level guest involves the use of second level and first level guest control registers (for address translation) as well as the zone origin. In the preferred embodiment, a special mode indicator is set in the hardware whenever a second level guest is operating so that the hardware will know when to employ enhanced address translation for a second level guest.

The provision of a first level guest save area and the logic for saving and restoring first level facilities and the provision of additional translation parameter facilities with the appropriate operational control allow the hardware and microcode to interpretively execute a second level guest using native machine facilities without exiting the first level guest and incurring the overhead necessary to monitor that exit and reinitiation.

In the preferred embodiment of the present invention, apparatus and methods directed at providing second level guest timing facilities are implemented. The IBM 3090 computer systems on which the present invention has been implemented, provide only a single set of hardware implemented timing facilities. These include a time-of-day (TOD) clock, a CPU timer and clock comparator. The prior art systems only provided for first level guest timing. The first level guest timing facilities were implemented without adding additional hardware (i.e., without a second hardware clock) by providing microcode using the clock comparator hardware to maintain a difference or delta value between the host clock and first level guest clock (see FIG. 5). This implementation generates an interrupt at the closest impending interrupt whenever:

1) the host clock comparator 510 value is less than the host TOD;

2) the guest clock comparator value is less than the guest TOD (the guest TOD is equal to the host TOD plus a delta for the epoch value 514 specified by the host program);

3) the guest CPU timer value is less than zero. The actual values related to the host clock comparator, the guest clock comparator and the guest CPU timer are kept in a first level guest local reserved working store array as shown in FIG. 5.

The enablement of direct second level guest interpretive execution requires a change to the timing facilities. The prior art systems initiated second level guests as first level guests and could therefore use the first level guest timing facilities. Direct interpretation of second level guests requires an associated second level guest timing facility.

The second level guest timing facilities are constrained in that both host timing facilities and first level guest timing facilities must continue to operate while the second level guest is operating. Thus, an interrupt caused by the host timer or first level guest timer must cause a real processor interrupt. The second level guest clock comparator and CPU timer values are kept in second level guest local reserved working store arrays (FIG. 6). Constant monitoring of timing facilities for the second level guest, the first level guest and the host would add overhead and reduce processing efficiency. In the preferred embodiment of the present invention, the second level timing facilities are only checked periodically and not at every clock tick. The periodic checking, in the preferred embodiment, coincides with hardware signalled processing of pending interrupt conditions. This processing occurs, for example, every 256 microseconds and includes an evaluation of the second level guest clock comparator 612 and CPU timer values relative to the hardware TOD value to determine whether an interrupt should be taken. The second level guest timing facilities are checked only when a second level guest is running. The timing facility values are stored in a local reserve working store array as shown in FIG. 6.

The difference between the second level guest TOD and the host TOD (referred to as the delta or epoch of the second level) is, in the preferred embodiment, the sum of the first level guest epoch and the second level guest epoch and is stored in the working store array 610.

The second level guest timing facility analysis performs two tests to determine whether a second level guest timing interrupt has become pending. First, the guest clock comparator, adjusted by the sum of the epochs, is subtracted from the current host TOD. If the result is positive (TOD exceeds clock comparator), then a second level guest clock comparator interrupt is pending. If the appropriate masking (guest #2 PSW bit 7 and guest #2 control reg 0 bit 20) is enabled an external interrupt is taken by the second level guest. If either mask is disabled, the second level guest clock comparator interrupt pending flag is set in the guest #2 timing flag area 614.

Second, the guest #2 CPU timer, adjusted by the value of the host TOD at the time when the guest #2 CPU timer was loaded is subtracted from the current host TOD. If the result is positive (guest #2 CPU timer less than 0), then a guest #2 CPU timer interrupt is pending. If the appropriate masking is enabled, an external interrupt is taken by the second level guest. If either mask is disabled, the guest #2 CPU timer interrupt pending flag is set in the guest #2 timing flags 614. The interrupt pending flags will be checked each time a new PSW or control reg 0 is loaded to determine whether a pending interrupt is now enabled and should be taken.

The approach of the preferred embodiment allows implementation of second level guest timing facilities without requiring additional clock hardware. This implementation provides for timing facilities at the second level without a decrease in performance.

The preferred embodiment has been described in terms of a microcode implementation. It will be understood by those in the art that these functions could also be implemented directly in hardware in a combination of hardware and microcode.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer system having a random access storage containing a host operating system and two levels of virtual machines for executing programs on one or more instruction processors, additional machine facilities for controlling the system comprising:
   means for partitioning the random access storage into multiple dedicated regions, each region being located at a particular partition offset within the storage, and each region being associated with a first level machine;
   means for detecting a request from a guest operating system program executing on a processor under a first level virtual machine to initiate operation of a second level virtual machine;
   means for saving tile machine parameters currently associated with the first level virtual machine in response to detection of the request by the detecting means;
   means for initiating program execution of tile second level virtual machine on the processor in response to the request after saving the machine parameters associated with the first level virtual machine;
   address translation means for translating virtual addresses of second level virtual machine programs executing in the processor;
   timing facility means for timing second level events relative to a first level timing facility for the first level virtual machine and also for timing second level events relative to a host timing facility for the host operating system while the first level timing facility and the host timing facility remain active; and
   means for exiting program execution on the processor for the second level virtual machine and for returning program execution on the processor to the first level virtual machine by restoring machine parameters saved by the saving means for the first level virtual machine.

2. A computer system as defined in claim 1, in which the initiating means further comprises:
   means for causing execution of a program by the first level virtual machine, the program containing an instruction that calls for initiation of the second level virtual machine and locates a state description control block associated with the second level virtual machine, the state description control block containing machine facility parameters currently associated with the second level virtual machine;
   means for saving current machine facility parameters associated with the first level virtual machine in a save area associated with the first level virtual machine;
   means for loading the virtual machine facility parameters associated with the second level virtual machine from the state description control block into the processor while the first level timing facility means and the address translation means remain active;
   means for setting of a second level virtual machine execution mode indicator for use by the processor to enable the address translation means for translating virtual addresses of second level virtual machine programs; and
   means for initiating execution of a program under the second level virtual machine, 3. A computer system as defined in claim 1, in which the address translation means further comprises:
   translating virtual addresses to real addresses for programs executing under the second level virtual machine using second level virtual machine address translation parameters;
   translating the second level virtual machine real addresses to first level virtual machine real addresses using first level virtual machine address translation parameters; and
   transforming the first level virtual machine real addresses into random access storage addresses by adding a first level virtual machine partition offset to each first level virtual machine real address.

4. A computer system as defined in claim 1 having interrupt conditions relating to the second level timing facility means, to the first level timing facility, and to the host timing facility, in which the timing facility means further comprises:
   means for updating, maintaining, and detecting the interrupt conditions;
   means for loading into the processor timing facility parameters stored in a state description control block for the second level virtual machine upon initiation of execution of a program under the second level virtual machine by the initiating means;
   means for periodically updating values of the timing facility parameters for the second level virtual machine and for testing the updated values to detect occurrence of a timed event; and means for storing updated timing facility parameters for the second level virtual machine upon exiting from the program execution under the second level virtual machine.

5. A computer system as defined in claim 1, in which the exiting means further comprises:

means for saving updated values of machine parameters in a save area associated with the second level virtual machine by saving the machine parameters in a state description control block associated with the second level virtual machine located in storage assigned to the first level virtual machine;

means for loading machine facilities parameters from a save area associated with the first level virtual machine into the processor; and means for initiating execution of a program executing under the first level virtual machine.

* * * * *